(12) United States Patent
Kelchner

(10) Patent No.: US 6,309,435 B1
(45) Date of Patent: Oct. 30, 2001

(54) BAG DUMP APPARATUS

(75) Inventor: Steven S. Kelchner, South Williamsport, PA (US)

(73) Assignee: The Young Industries, Inc., Muncy, PA (US)

( * ) Notice: Subject to any disclaimer, the term of this patent is extended or adjusted under 35 U.S.C. 154(b) by 0 days.

(21) Appl. No.: 08/932,090

(22) Filed: Sep. 18, 1997

(51) Int. Cl.$^7$ .............................. B01D 29/52; B01D 45/04; B01D 35/30
(52) U.S. Cl. .............................. 55/302; 55/319; 55/341.1; 55/432; 55/467
(58) Field of Search ................................. 55/341.1, 341.7, 55/432, 428, 467, 472, 473, 471, 302, 318, 319; 406/171, 170, 167, 122, 172

(56) References Cited

U.S. PATENT DOCUMENTS

| | | | |
|---|---|---|---|
| 530,445 | * 12/1894 | Newby | 55/341.1 |
| 1,218,632 | * 3/1917 | Derry | 220/404 |
| 1,743,934 | * 1/1930 | Ruemelin | 55/341.1 |
| 2,145,559 | * 1/1939 | Schwarze | 55/466 |
| 3,867,116 | * 2/1975 | Muller | 55/466 |
| 4,889,452 | * 12/1989 | Heyl | 406/85 |
| 5,097,750 | * 3/1992 | Oldham | 454/63 |

FOREIGN PATENT DOCUMENTS

2275384 * 1/1976 (FR) ............................ 55/467

\* cited by examiner

Primary Examiner—David A. Simmons
Assistant Examiner—Robert A. Hopkins
(74) Attorney, Agent, or Firm—Lalos & Keegan

(57) ABSTRACT

An apparatus into which particulate material may be charged for further handling generally includes a housing having a support wall including a primary inlet through which particulate material may be charged, producing portions of settling and airborne particles of such material, and at least one secondary inlet, and an outlet through which the particulate material may be discharged, a filter unit having an inlet communicating with the interior of the housing and means for producing an airflow from the primary and secondary inlets through the filter unit whereby ambient air will be caused to be drawn through the primary and secondary inlets and the filter unit, entraining airborne particles outside and within the housing which further are caused to be removed from such airflow by the filter unit, dislodged therefrom and be discharged through the housing outlet.

15 Claims, 2 Drawing Sheets

BAG DUMP APPARATUS

This invention relates to bulk material handling and more particularly to an apparatus into which particulate material may be charged for further processing, conveying, handling or storage, commonly referred to as bag dump stations.

BACKGROUND OF THE INVENTION

In many industries and other commercial enterprises, bulk particulate material often is transported in bags which may be handled manually, when such material situated at a use site is to be used for processing or some other purpose, such bags typically are manually ruptured, lifted and dumped into receptacles of pneumatic or other conveying systems. In doing so, a certain amount of dust is generated which may pollute the environment in the vicinity of the work area and elsewhere, may create a health hazard for workmen in the vicinity of the area and possibly cause a loss of useful material.

In the prior art, there has been developed a type of apparatus into which the particulate material contents of such rupturable bags may be charged for further handling. Such type of apparatus generally includes a hopper having a grate disposed across an inlet opening thereof into which the contents of bagged material may be charged, a filter unit having an inlet communicating with the interior of the hopper and a blower fan for drawing airborne particles produced by the charging of such material into the hopper, from the vicinity of the work area, and conveying such particles through the filter unit to prevent them from escaping into the ambient atmosphere and possibly causing environmental problems in the work area. An example of such an apparatus is illustrated and described in U.S. Pat. No. 4,889,452.

Although the type of apparatus described has been very effective in preventing the escape of airborne particles and recovering a maximum amount of material being dumped, it has been desirable to provide such an apparatus which is even more effective in preventing environmental pollution and recovering a maximum amount of material being dumped.

Accordingly, it is the principal object of the present invention to provide an improved apparatus into which the particulate material contents of rupturable bags may be charged.

Another object of the present invention is to provide an improved apparatus into which the particulate material contents of rupturable bags may be charged, capable of not only preventing pollution of the environment of the work area but recovering airborne particles created by the dumping operation.

A further object of the present invention is to provide an apparatus into which the particulate material contents of a ruptured bag may be charged, creating airborne particles of such material, in which both exterior and interior airborne particles created by such dumping action may be more effectively recovered for further processing, conveying, handling or storage purposes.

A still further object of the present invention is to provide an apparatus into which the particulate material contents of ruptured bags may be charged which is comparatively simple in construction, relatively easy to maintain and highly effective in recovering any exterior or interior airborne particles created by the charging action of the material.

Other objects and advantages of the present invention will become more apparent to those persons having ordinary skill in the art to which the present invention pertains from the following description taken in conjunction with the accompanying drawings.

SUMMARY OF THE INVENTION

The present invention consists of an apparatus into which particulate material may be charged for further handling generally consisting of a housing having a support wall or pan including a primary inlet through which particulate material contained in a rupturable bag may be charged, producing portions of settling and airborne particles of such material, and at least one secondary inlet, and an outlet through which the particulate material may be discharged, a filter unit having an inlet communicating with the interior of the housing and means for producing an airflow from the primary and secondary inlets of the support wall and through the filter unit with sufficient velocity whereby ambient air will be caused to flow through such inlets, the interior of the housing and the filter unit, entraining airborne particles disposed outside and inside the housing which further are caused to be filtered out by the filter unit, to be discharged through the housing outlet with the settling portion of the charged material.

DESCRIPTION OF THE PREFERRED EMBODIMENT OF THE INVENTION

Figure 1:
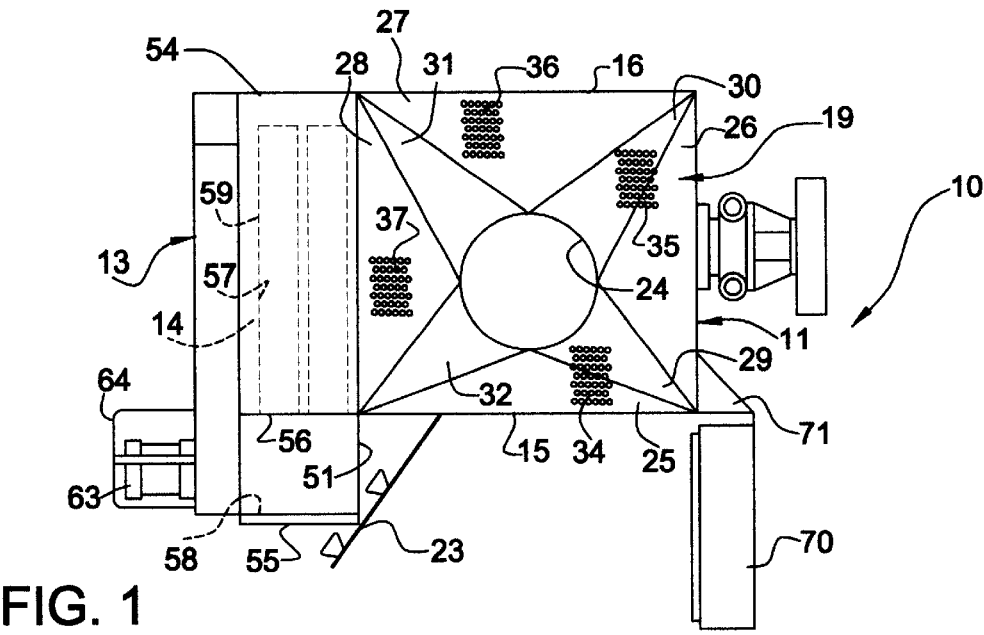
FIG. 1 is a top plan view of an embodiment of the invention.

Referring to the drawings, there is illustrated an apparatus 10 embodying the present invention which includes a main housing section 11, a hopper section 12 depending from the main housing section and a section 13 supported on the main housing section containing a filter unit 14. The main housing section includes a pair of front and rear walls 15 and 16 having portions of upper corners thereof removed for receiving housing section 13, a pair of side walls 17 and 18 and an upper support wall or pan 19, providing a lower opening communicating with the interior of hopper section 12. The periphery of the main housing section is provided with an angle support 20 which rests on a floor 21 about the periphery of an opening 22 therein, with the lower end of the main housing extending a short distance through such opening and hopper section 12 depending therefrom. Access to the interior of the main housing section is provided by a door 23 mounted on front panel 15.

Figure 2:
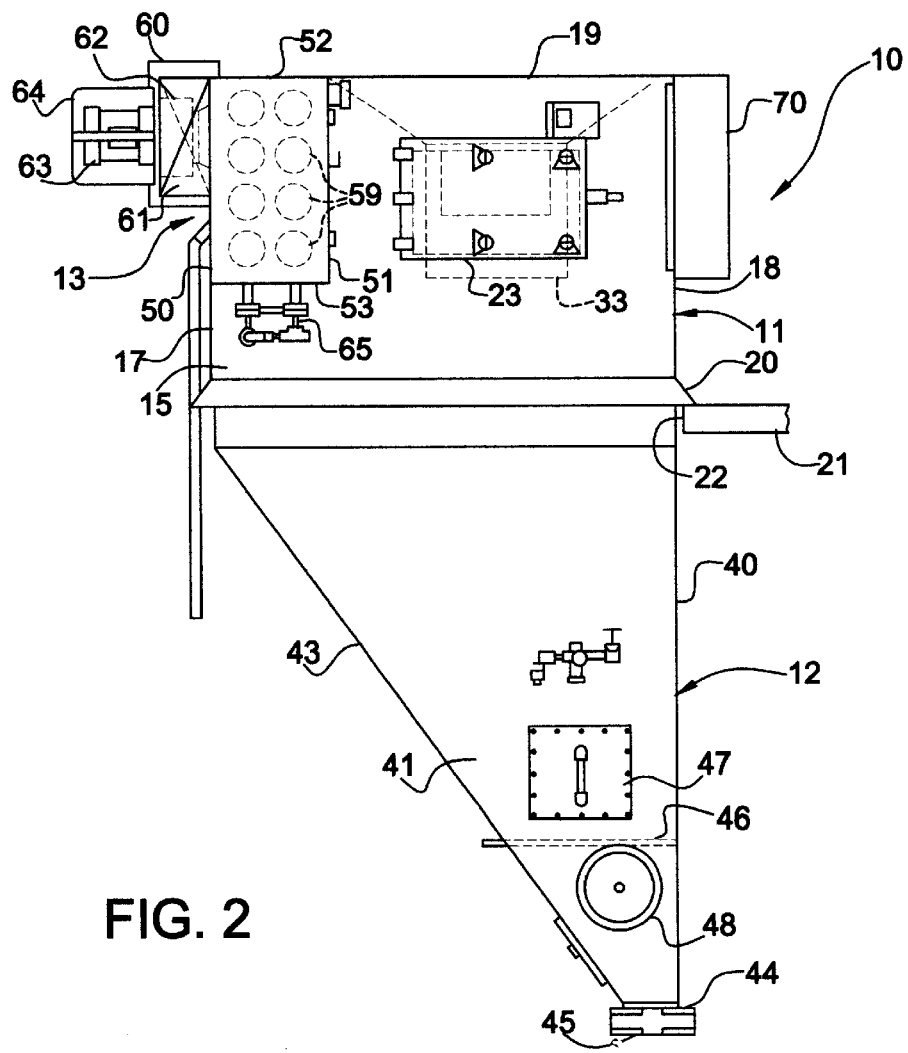
FIG. 2 is a front elevational view of the embodiment shown in FIG. 1.
Figure 3:
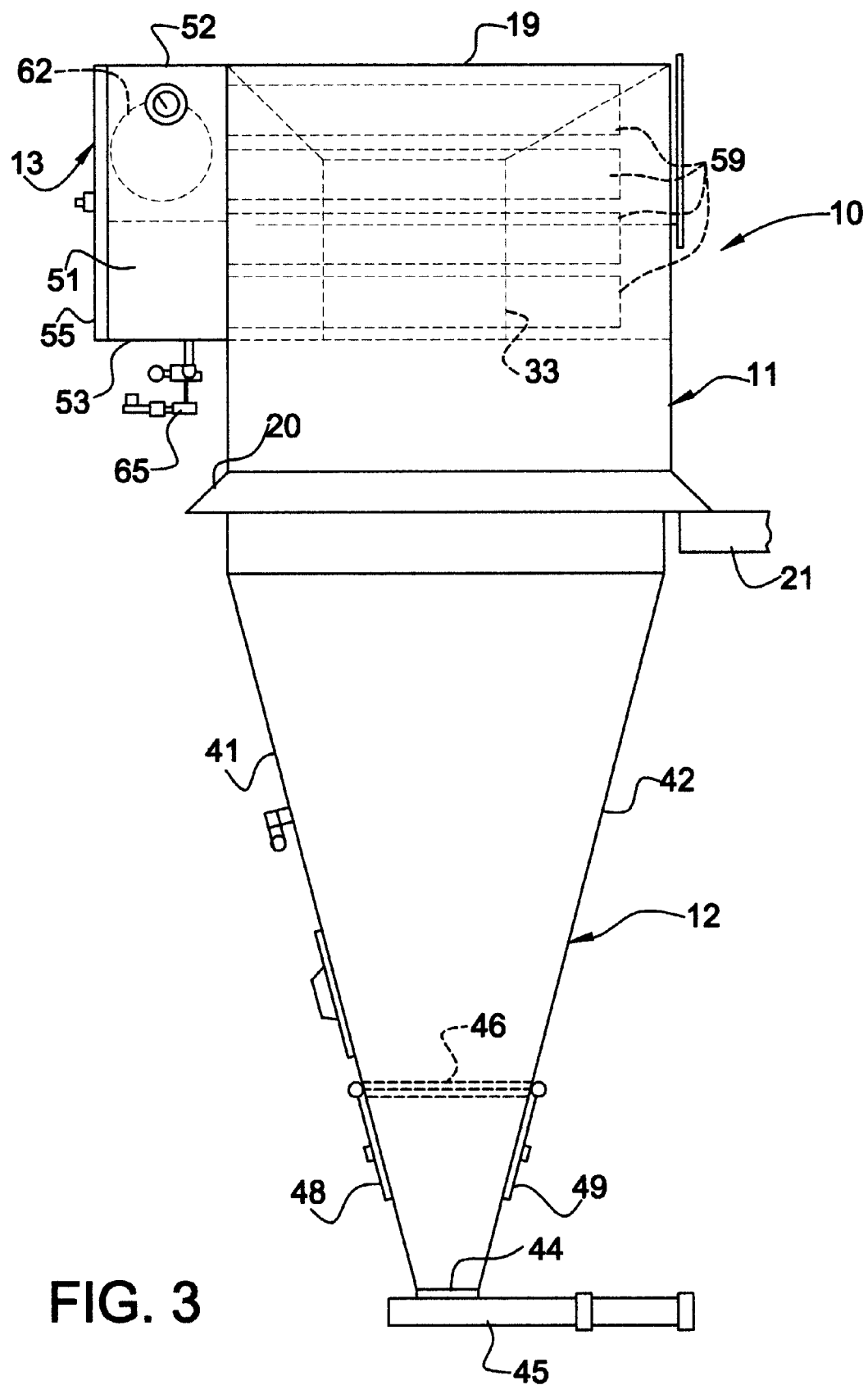
FIG. 3 is a side elevational view of the embodiment shown in FIGS. 1 and 2.

Support wall 19 of the main housing section is provided with a circular inlet opening 24 in the center thereof, and is formed with a plurality of inwardly and downwardly inclined, triangularly shaped panels 25, 26, 27 and 28 spaced about circular opening 24, and a set of similarly downwardly and inwardly inclined panels 29, 30, 31 and 32 each disposed between successive panels of the first set of panels. Depending from such set of panels is a cylindrical chute or conduit 33, as best seen in FIGS. 2 and 3, which intercommunicates inlet 24 and the interior of the main housing section. Provided in the panels is a set of clusters of perforations 34, 35, 36, and 37 which are spaced about the periphery of inlet opening 24 and intercommunicate the exterior and interior of the main housing section.

Hopper section 12 is formed integrally with main housing section 11 and includes a wall 40 aligned with wall 18 of the main housing section, a pair of converging walls 41 and 42 and a converging wall 43 which terminate at a lower discharge opening 44 provided with a slide valve 45. The discharge opening is adapted to communicate through valve 45 with a conventional pneumatic conveying line. Secured to the side walls of housing section 12 is a screen 46 disposed above opening 44. Access to screen 46 may be obtained through a removable panel 47 provided on wall 41 in the vicinity of screen 46. Below the screen, there is provided a pair of aeration pads 48 and 49 which function to fluidize and thereby facilitate the flow of material through outlet 44.

Housing section 13 has substantially a rectangular configuration and is supported in the cutout portions of front and rear walls 15 and 16 and side wall 17, with a portion thereof extending beyond the plane of front wall 15 of the main housing section. It includes an outer side wall 50 forming a continuation of side wall 17 and extending in cantilevered fashion beyond front wall 15 of the main housing section, an inner wall section 51 disposed in opposed relation to outer wall 50, an upper wall 52 lying in substantially the same plane as support wall 19 of the main housing section, a bottom wall 53 extending from the outer ends of side walls 51 and 52 to front wall 15 of the main housing section, a rear wall 54 disposed in the same plane as rear wall 16 of the main housing section and an access door 55 closing a front end of the section. A partition wall or tube sheet 56, lying substantially in the plane of front wall 15 of the main housing section, is disposed between side walls 50 and 51, spaced from access door 55 in the closed position, to provide a filter chamber 57 defined by side walls 50 and 51, upper wall 52, end wall 54 and tube sheet 56, having a lower opening communicating with the interior of the main housing section, and an air plenum 58 defined by side walls 50 and 51, upper and lower walls 52 and 53, tube sheet 56 and access door 55.

Disposed in the filter chamber is a plurality of filter assemblies 59. Each of such assemblies consists of a tubularly configured cage member removably inserted through an inlet opening in tube sheet 56 and supported on the tube sheet with the interior thereof communicating with air plenum chamber 58, and a bag of fabric or felt filter material disposed on the cage member, having the free end thereof clamped between an annular flange portion of the cage member and the tube sheet in the conventional manner. Each of the filter assemblies extends almost the entire length of the filter chamber in which they are installed so that particle laden airflow entering through the lower inlet opening of the filter chamber will impinge upon the assemblies and filter out airborne particles, causing filtered air to flow through the filter assemblies and into air plenum 58.

Mounted on the upper end of side wall 50 of housing section 13 is a housing section 60 providing an elongated chamber 61 having an inlet opening communicating with air plenum 58 and an outlet opening communicating with the atmosphere or a conduit communicating with the atmosphere. Mounted on side wall 50 within chamber 51 is a fan wheel 62 driven by an electric motor 63 mounted on housing 60, protected by a motor guard 64. Fan wheel 62 is mounted on the shaft of motor 63 and has an axially disposed inlet communicating through an opening in side wall 50 with air plenum 58, and radially disposed outlets communicating with air plenum 61. Fan wheel 62 driven by motor 63 will draw air from air plenum 58 and discharge it through air plenum 61 into the atmosphere.

Disposed within air plenum 58 is a plurality of nozzles each directed axially through an inlet opening in tube sheet 56 and the interior of a filter assembly 59 for injecting pulses of high pressure air therein to provide a pneumatic shock wave within the bag of the filter assembly, causing it to flex and thus dislodge filtered material deposited on the filter medium of the assembly. Such nozzles are periodically supplied with compressed air through a supply line 65 provided with valves controlled by a solid state timer which progressively actuates such valves to introduce pulses of high pressure air through the nozzles. Typically, the cleaning cycle of the filter assemblies alternates continuously allowing those assemblies that are not in the cleaning mode to continue filtering.

A control panel 70 supported on a bracket 71 secured to side wall 18 of the main housing section is provided for controlling the operation of motor 63 and the supply of air for aeration pads 48 and 49 and for backflushing filter assemblies 59 as previously described.

In the operation of the apparatus as described, when it is desired to charge the particulate material contents of a bag into the apparatus for subsequent handling, the operator of the apparatus first operates the controls to energize electric motor 63 and supply air pressure to aeration pads 48 and 49. Upon energization of motor 63, fan wheel 62 will cause air to be drawn through primary charging inlet 24 and secondary inlets 36 in support wall 19, the interior of main housing section 11, filter chamber 57, obtaining access through the lower open end thereof, filter assemblies 59, air plenum 58, fan wheel 62 and air plenum 61. With such an airflow created through the apparatus, the operator then ruptures an opening in the bag of material and discharges the contents through the ruptured opening into primary inlet 24. The bulk of such material will gravity fall through the main and hopper sections, screen 46 and outlet 44 into the pneumatic conveying line where it is transported to a remote site. Aeration pads 48 and 49 function to fluidize the material to enhance its flow through discharge outlet 44.

Depending upon the particle size of the material being charged into the apparatus, a certain amount of such particles will become airborne both outside and inside the main housing section. The airflow, however, injected through primary and secondary inlets 24 and 36, will cause such airborne particles to be entrained in the induced airflow and be carried through the interior of the main housing section and the filter chamber to be filtered out by the filter assemblies. The filtered air passing through the filter assemblies will continue to flow through air plenum 58 and air plenum 61 to be discharged into the atmosphere. As filtered material deposits on the filter mediums of the filter assemblies, such material is dislodged by sequential bursts of air through the filter assemblies, causing such dislodged material to gravity fall and be discharged through discharge opening 44.

Typically, the size of primary inlet 24 accommodates the entry of the bulk of the material being charged into the apparatus. The downwardly and inwardly inclined panels of support wall 19 facilitate the flow of dumped material towards and through inlet 24. Particles becoming airborne in the area about primary inlet 24 will be drawn by the induced airflow through secondary openings 34 thus preventing the escape of such particles into the atmosphere in the vicinity of the apparatus, thus polluting such atmosphere and possibly creating a health hazard for the operator.

The various components of the apparatus including the area of support wall 19, the areas of the primary and secondary inlets, the area of the filter media and the rating of the fan wheel motor can be sized to accommodate the particle sizes of a variety of materials with which the apparatus is to be used. It has been found that with the primary inlet having a diameter of 20 inches, the secondary openings having diameters in the order of three-eighths of an inch and the eight filter assemblies having lengths of about 42 inches and diameters of proximately 4 inches and being provided with a polyester felt medium, a 1½ hp., 3-phase electric motor producing an airflow of 1,150 cfm. is sufficient to entrain airborne particles outside and inside the main housing chamber in providing satisfactory performance of the apparatus.

From the foregoing detailed description, it will be evident that there are a number of changes, adaptations and modifications of the present invention which come within the province of those persons having ordinary skill in the art to which the aforementioned invention pertains. However, it is intended that all such variations not departing from the spirit of the invention be considered as within the scope thereof as limited solely by the appended claims.

I claim:

1. An apparatus into which particulate material may be charged for further handling, comprising:

a housing having a closed support wall including a primary inlet through which said particulate material may be charged, producing portions of settling and airborne particles of said material within and outside said housing, and at least one substantially smaller secondary inlet, and an outlet through which said particulate material may be discharged;

a filter unit having an inlet communicating with an interior of said housing; and means for producing an airflow through said primary and secondary inlets, said housing and said filter unit whereby ambient air will be caused to flow from outside the housing directly into said primary and secondary inlets, leading to the interior of said housing and said filter unit, entraining airborne particles disposed within and outside said housing which further are caused to be filtered out by said filter unit to be discharged through said housing outlet.

2. An apparatus according to claim 1 wherein said support wall is substantially horizontal.

3. An apparatus according to claim 1 including a plurality of secondary inlets disposed about a periphery of said primary inlet.

4. An apparatus according to claim 1 wherein said support wall includes a plurality of sections each inclined inwardly and downwardly toward said primary inlet.

5. An apparatus according to claim 1 wherein said support wall is substantially horizontal, consists of a plurality of sections inclined inwardly and downwardly toward said primary inlet and includes a plurality of secondary inlets spaced about the periphery of said primary inlet.

6. An apparatus according to claim 1 including a material guide conduit depending from said support wall and intercommunicating said primary inlet and the interior of said housing.

7. An apparatus according to claim 1 wherein said filter unit includes at least one filter assembly disposed within said housing.

8. An apparatus according to claim 7 including a baffle wall disposed between said filter assembly and said primary inlet.

9. An apparatus according to claim 7 including means for back flushing said filter assembly for dislodging airborne particles deposited thereon.

10. An apparatus according to claim 7 including a material guide conduit depending from said support wall and intercommunicating said primary inlet and the interior of said housing.

11. An apparatus according to claim 1 including a substantially vertically disposed guide conduit depending from said support wall, intercommunicating said primary inlet and the interior of said housing and having a downwardly opening outlet, said filter unit includes at least one filter assembly disposed within said housing and including a baffle wall cooperating with side walls of said housing to define a filter chamber having a downwardly opening inlet.

12. An apparatus according to claim 11 wherein said support wall is disposed substantially horizontal, and said depending guide conduit and baffle wall are disposed substantially vertical.

13. An apparatus according to claim 1 wherein said housing includes a lower hopper section.

14. An apparatus according to claim 1 wherein said outlet includes a valve.

15. An apparatus according to claim 1 wherein said airflow inducing means comprises a motor driven fan wheel.

* * * * *